US008611002B2

(12) United States Patent
Frith

(10) Patent No.: US 8,611,002 B2
(45) Date of Patent: Dec. 17, 2013

(54) OPTICAL FIBER LASERS AND AMPLIFIERS AND METHODS FOR PROVIDING OPTICAL GAIN

(76) Inventor: Gavin P. Frith, Wantirna South (AU)

(*) Notice: Subject to any disclaimer, the term of this patent is extended or adjusted under 35 U.S.C. 154(b) by 483 days.

(21) Appl. No.: 12/890,249

(22) Filed: Sep. 24, 2010

(65) Prior Publication Data

US 2011/0075252 A1  Mar. 31, 2011

Related U.S. Application Data

(60) Provisional application No. 61/245,308, filed on Sep. 24, 2009.

(51) Int. Cl.
*H04B 10/17* (2011.01)
(52) U.S. Cl.
USPC ............... 359/341.3; 359/341.1; 359/341.5; 372/6
(58) Field of Classification Search
USPC .............. 359/341.1, 341.3, 341.5; 372/6
See application file for complete search history.

(56) References Cited

U.S. PATENT DOCUMENTS

| 5,134,517 | A  | * | 7/1992  | Marcerou et al. ........... 359/341.3 |
|-----------|----|---|---------|--------------------------------------|
| 6,266,180 | B1 | * | 7/2001  | Inagaki et al. ................. 359/337 |
| 6,477,307 | B1 |   | 11/2002 | Tankala et al. |
| 6,496,301 | B1 | * | 12/2002 | Koplow et al. ................. 359/337 |
| 6,625,363 | B2 |   | 9/2003  | Carter et al. |
| 6,687,445 | B2 |   | 2/2004  | Carter et al. |
| 6,779,364 | B2 |   | 8/2004  | Tankala et al. |
| 7,003,206 | B2 |   | 2/2006  | Tankala et al. |
| 7,050,686 | B2 |   | 5/2006  | Farroni et al. |
| 7,062,137 | B2 |   | 6/2006  | Farroni et al. |
| 7,277,610 | B2 |   | 10/2007 | Demidov et al. |

(Continued)

FOREIGN PATENT DOCUMENTS

| WO | 02059660   | 8/2002 |
|----|------------|--------|
| WO | 2006017802 | 2/2006 |
| WO | 2010085605 | 7/2010 |

OTHER PUBLICATIONS

J.M. Oh et al., "Increased pulsed fiber amplifier efficiency by manipulating the fiber dopant distribution," CLEO/QELS 2006.

(Continued)

*Primary Examiner* — Eric Bolda
(74) *Attorney, Agent, or Firm* — McDonnell Boehnen Hulbert & Berghoff LLP

(57) ABSTRACT

The present invention relates generally to devices for the generation and amplification of electromagnetic energy. The present invention relates more particularly to optical fiber devices, such as lasers and amplifiers, useful for generating and amplifying optical energy. Accordingly, one aspect of the present invention is an optical fiber device for providing optical gain at a selected wavelength, the optical fiber device comprising: one or more sources of optical pump energy; a first length of optical fiber having a core comprising a first cross-sectional region within which the concentration of a rare earth does not fall below 50% of its highest concentration; and a second length of optical fiber comprising a core comprising a first cross-sectional region within which the concentration of the rare earth does not fall below 50% of its highest concentration, wherein the intensity of optical pump energy is higher in the first length of optical fiber than in the second, and the first cross-sectional region of the core of the second length of optical fiber is larger in area than the first cross-sectional region of the core of the first length of optical fiber.

22 Claims, 9 Drawing Sheets

(56) References Cited

U.S. PATENT DOCUMENTS

2002/0003937 A1* 1/2002 Aiso ............................. 385/123
2004/0240043 A1 12/2004 Demidov et al.
2007/0053400 A1* 3/2007 Sinha et al. ..................... 372/64
2007/0229940 A1* 10/2007 Sintov ........................ 359/341.3

OTHER PUBLICATIONS

Bertrand Morasse et al., "Low photodarkening single cladding ytterbium fibre amplifier," Proceedings of SPIE, vol. 6453, Fiber Lasers IV: Technology, Systems, and Applications, 64530H(2007).

Y. Jeong et al., "Single-frequency, single-mode, plane-polarized ytterbium-doped fiber master oscillator power amplifier source with 264 W of output power," Optics Letters, 30, 459-461 (2005).

D. Taverner et al., "158 microJ pluses from a Single Transverse Mode, Large Mode-Area EDFA," published as Optics Letters, 22, 378-80 (1997).

S. Yoo, et al., "Photodarkening in Yb-doped aluminosilicate fibers induced by 488 nm irradiation," Optics Letters, 32, 1626-28 (2007).

M. Engholm et al., "Comment on 'Photodarkening in Yb-doped aluminosilicate fibers induced by 488 nm irradiation'," Optics Letters, 33, 1216 (Jun. 1, 2008).

S. Yoo et al., "Reply to comment on 'Photodarkening in Yb-doped aluminosilicate fibers induced by 488 nm irradiation'," Optics Letters, 33, 1217-18 (Jun. 1, 2008).

* cited by examiner

OPTICAL FIBER LASERS AND AMPLIFIERS AND METHODS FOR PROVIDING OPTICAL GAIN

CROSS-REFERENCE TO RELATED APPLICATIONS

The present application claims priority to U.S. Provisional Patent Application Ser. No. 61/245,308, filed on Sep. 24, 2009, which is hereby incorporated herein by reference in its entirety.

BACKGROUND OF THE INVENTION

1. Field of the Invention

The present invention relates generally to devices for the generation and amplification of electromagnetic energy. The present invention relates more particularly to optical fiber devices, such as lasers and amplifiers, useful for generating and amplifying optical energy.

2. Technical Background

Optical fiber lasers and amplifiers are known in the art. In such lasers and amplifiers, rare earth materials disposed in the core of the optical fiber therein absorb pump radiation of a predetermined wavelength, and, in response thereto, provide or amplify light of a different wavelength for propagation in the core. For example, the well-known erbium doped fiber amplifier receives pump radiation having a wavelength of 980 or 1480 nm, and amplifies an optical signal propagating in the core and having a wavelength of about 1550 nm.

In such optical fiber lasers and amplifiers, the pump radiation can be introduced directly to the core, which can be difficult due to the small size of the core, or can be introduced to the cladding layer surrounding the core and absorbed by the core as the rays propagating in the cladding layer intersect the core. Lasers and amplifiers in which the pump radiation is to be introduced to the cladding layer are known as "cladding pumped" optical devices. Cladding pumping can facilitate the scale-up of lasers and amplifiers to higher power systems.

One complication is that cooperative effects that can cause excess loss, increase noise, or even damage the optical fiber. Accordingly, in certain applications, it can be desirable to minimize up-conversion and luminescence in rare earth doped fiber devices, as they can tend to limit the gain achievable by the device, decrease pumping efficiency, and increase noise to unacceptable levels.

Accordingly, there remains a need in the art for optical fiber devices, such as lasers and amplifiers, that provide acceptable gain and efficiency and suffer relatively less from these cooperative effects.

SUMMARY OF THE INVENTION

One aspect of the invention is an optical fiber device for providing optical gain at a selected wavelength, the optical fiber device comprising:
  one or more sources of optical pump energy;
  a first length of optical fiber comprising a core and a first cladding disposed about the core, the first cladding and core configured to guide light of a selected wavelength, the core comprising a concentration of a rare earth for providing the optical gain in response to receiving optical pump energy, the core comprising a first cross-sectional region within which the concentration of the rare earth does not fall below 50% of its highest concentration; and
  a second length of optical fiber comprising a core and a first cladding disposed about the core, the first cladding and core configured to guide light of the selected wavelength, the core comprising a concentration of the rare earth for providing the optical gain in response to receiving optical pump energy, the core comprising a first cross-sectional region within which the concentration of the rare earth does not fall below 50% of its highest concentration,
wherein the one or more sources of optical pump energy are optically coupled to the first length of optical fiber and the second length of optical fiber, such that the intensity of optical pump energy is higher in the first length of optical fiber than in the second length of optical fiber, and
  the first cross-sectional region of the core of the second length of optical fiber is larger in area than the first cross-sectional region of the core of the first length of optical fiber.

In certain embodiments, the one or more sources of optical pump energy are optically coupled to the first length of optical fiber and the second length of optical fiber such that at least 2% of the fiber-coupled optical pump energy from each of the one or more sources of optical pump energy is delivered to the first length of optical fiber and the second length of optical fiber.

Another aspect of the present invention is an optical fiber device for providing optical gain at a selected wavelength, the optical fiber device comprising:
  a source of optical pump energy;
  a first length of optical fiber comprising a core and a first cladding disposed about the core, the first cladding and core configured to guide light of a selected wavelength, the core comprising a concentration of a rare earth for providing the optical gain in response to receiving optical pump energy, the core comprising a first cross-sectional region within which the concentration of the rare earth does not fall below 50% of its highest concentration; and
  a second length of optical fiber comprising a core and a first cladding disposed about the core, the first cladding and core configured to guide light of the selected wavelength, the core comprising a concentration of the rare earth for providing the optical gain in response to receiving optical pump energy, the core comprising a first cross-sectional region within which the concentration of the rare earth does not fall below 50% of its highest concentration,
wherein the first length of optical fiber and the second length of optical fiber are optically coupled to the source of optical pump energy such that the first length of optical fiber is optically coupled between the and the second length of optical fiber, and
  the first cross-sectional region of the core of the second length of optical fiber is larger in area than the first cross-sectional region of the core of the first length of optical fiber.

In certain embodiments, the one or more sources of optical pump energy are optically coupled to the first length of optical fiber and the second length of optical fiber such that at least 2% of the fiber-coupled optical pump energy from each of the one or more sources of optical pump energy is delivered to the first length of optical fiber and the second length of optical fiber.

Another aspect of the invention is an optical fiber device as described above, further comprising
  a third length of optical fiber comprising a core and a first cladding disposed about the core, the first cladding and core configured to guide light of a selected wavelength, the core comprising a concentration of the rare earth for providing the optical gain in response to receiving optical pump energy, the core comprising a first cross-sectional area within which the concentration of the rare earth does not fall below 50% of its highest concentration, and a second cross-sectional area within which the concentration of the rare earth is at 50% of its highest concentration or below, wherein the one or more sources of optical pump energy are optically coupled to the third length of optical fiber, such that the intensity of optical pump energy is higher in the second length of optical fiber than in the third length of optical fiber, and such that at least 2% of the fiber-coupled optical pump energy from each of the one or more sources of optical pump energy is delivered to the third length of optical fiber; and the first cross-sectional region of the core of the third length of optical fiber is larger in area than the first cross-sectional region of the core of the second length of optical fiber.

In certain embodiments, the one or more sources of optical pump energy are optically coupled to the third length of optical fiber such that at least 2% of the fiber-coupled optical pump energy from each of the one or more sources of optical pump energy is delivered to the third length of optical fiber.

Another aspect of the invention is an optical fiber device as described above, in which the first length of optical fiber, the second length of optical fiber and the third length of optical fiber are optically coupled to the source of optical pump energy such that the first length of optical fiber and second length of optical fiber are optically coupled between one of the sources of optical pump energy and the third length of optical fiber.

Another aspect of the invention is an optical fiber device as described above configured as a fiber laser.

Another aspect of the invention is an optical fiber device as described above configured as a fiber amplifier.

Another aspect of the invention is a method of providing optical gain at a selected wavelength, the method including:

providing optical pump energy from one or more sources of optical pump energy to a first length of optical fiber comprising a core and a first cladding disposed about the core, the first cladding and core configured to guide light of the selected wavelength, the core comprising a concentration of a rare earth for providing the optical gain in response to receiving the optical pump energy, the core comprising a first cross-sectional region within which the concentration of the rare earth does not fall below 50% of its highest concentration; and providing optical pump energy from the one or more sources of optical pump energy to a second length of optical fiber optically coupled to the first length of optical fiber, the second length of optical fiber comprising a core and a first cladding disposed about the core, the first cladding and core configured to guide light of the selected wavelength, the core comprising a concentration of the rare earth for providing the optical gain in response to receiving the optical pump energy, the core comprising a first cross-sectional region within which the concentration of the rare earth does not fall below 50% of its highest concentration, wherein the optical pump energy is provided to the first length of optical fiber and to the second length of optical fiber such that the intensity of optical pump energy is higher in the second length of optical fiber than in the first length of optical fiber, and the first cross-sectional region of the core of the second length of optical fiber is larger in area than the first cross-sectional region of the core of the first length of optical fiber.

In certain embodiments, the one or more sources of optical pump energy are optically coupled to the first length of optical fiber and the second length of optical fiber such that at least 2% of the fiber-coupled optical pump energy from each of the one or more sources of optical pump energy is delivered to the first length of optical fiber and the second length of optical fiber.

Another aspect of the invention is a method as described above, further including providing optical pump energy from the one or more sources of optical pump energy to a third length of optical fiber optically coupled to the second length of optical fiber, the third length of optical fiber comprising a core, a cladding disposed about the core, the cladding and core configured to guide light of a selected wavelength, the core comprising a concentration of the rare earth for providing the optical gain in response to receiving the optical pump energy, the core comprising a first cross-sectional area within which the concentration of the rare earth does not fall below 50% of its highest concentration, and a second cross-sectional area within which the concentration of the rare earth is at 50% of its highest concentration or below, wherein the optical pump energy is provided to the third length of optical fiber such that the intensity of optical pump energy is higher in the third length of optical fiber than in the second length of optical fiber, and the first cross-sectional region of the core of the third length of optical fiber is larger in area than the first cross-sectional region of the core of the second length of optical fiber.

In certain embodiments, the one or more sources of optical pump energy are optically coupled to the third length of optical fiber such that at least 2% of the fiber-coupled optical pump energy from each of the one or more sources of optical pump energy is delivered to the third length of optical fiber.

Another aspect of the invention is an optical fiber device for providing optical gain at a selected wavelength, the optical fiber device including:

a source of optical pump energy; and one or more lengths of optical fiber, each comprising a core and a first cladding disposed about the core, the first cladding and core configured to guide light of the selected wavelength, the core comprising a concentration of a rare earth for providing the optical gain in response to receiving optical pump energy, the core comprising a first cross-sectional region within which the concentration of the rare earth does not fall below 50% of its highest concentration, the one or more lengths being optically coupled to one another in an end-to-end fashion, so that the one or more lengths taken together has a first end and a second end, and the source of optical pump energy is optically coupled to the one or more lengths of optical fiber at the first end, wherein for the distance along the one or more lengths of optical fiber from the first end extending toward the second end for which the field intensity of optical pump energy is greater than 1/e of the field intensity of the optical pump energy at the first end, the first cross-sectional region of the core of the one or more lengths of optical fiber is essentially monotonically increasing in area.

DETAILED DESCRIPTION OF THE INVENTION

Figure 1:
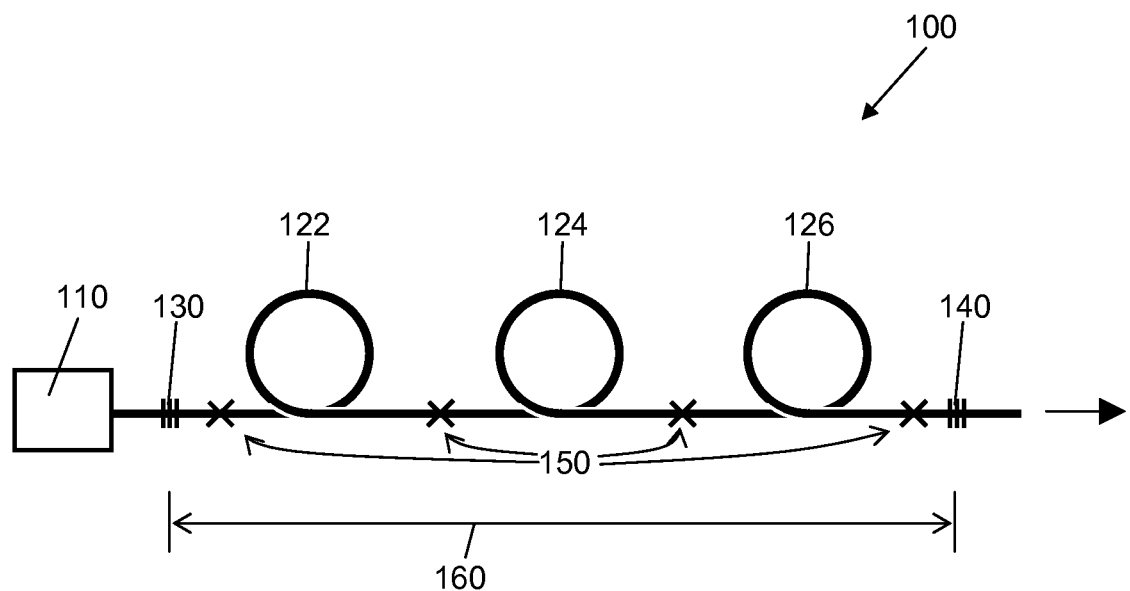
FIG. 1 is a schematic view of an optical fiber laser according to one embodiment of the invention.

One embodiment of the invention is shown in schematic view in FIG. 1. Optical fiber device 100 is configured as a fiber laser, and includes one or more sources of optical pump energy (here, a single source of optical pump energy 110), a first length of optical fiber 122, and a second length of optical fiber 124. In the embodiment shown in FIG. 1, the optical fiber device further includes a third length of optical fiber 126. The one or more sources of optical pump energy (here, the single source of optical pump energy 110) are optically coupled to the lengths of optical fiber 122, 124, 126. The first length of optical fiber 122 is optically coupled between the source of optical pump energy 110 and the second length of optical fiber 124, such that the intensity of the pump energy from source 110 is higher in the first length of optical fiber than in the second. In the embodiment of FIG. 1, the first length of optical fiber 122 and the second length of optical fiber 124 are optically coupled between the source of optical pump energy 110 and the third length of optical fiber 126, such that the intensity of the pump energy from source 110 is higher in the second length of optical fiber than in the third. To form a Fabry-Perot cavity 160, a highly reflective element 130 (e.g., a fiber Bragg grating) is optically coupled between the source of optical pump energy 110 and the first length of optical fiber 122; and a partially reflective element 140 (e.g., a fiber Bragg grating) is disposed at the end of the third length of optical fiber 126 that is opposite the second length of optical fiber 124, to act as an output coupler. Splices 150 are used to interconnect the various optical fibers. Of course, in the devices described herein, other methods can be used to couple the optical fibers to one another; desirably, no filters or isolators that would affect the transmission of pump energy are coupled between the optical fibers.

As described above, the one or more sources of optical pump energy are optically coupled to the lengths of optical fiber. That is, pump energy from the one or more sources of optical pump energy (i.e., at a pump wavelength) can couple into the lengths of optical fiber, such that at least 2% of the fiber-coupled optical pump energy from each of the one or more sources of optical pump energy is delivered to each length of optical fiber. In certain embodiments, the one or more sources of optical pump energy are coupled to the lengths of optical fiber such that at least 5%, at least 10%, or even at least 20% of the fiber-coupled pump energy from each of the one or more sources of optical pump energy is delivered to each length of optical fiber.

Figure 2:
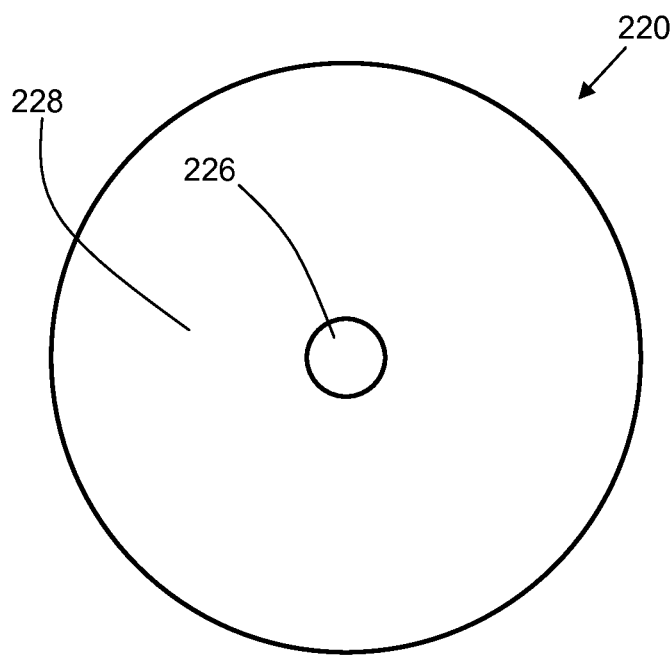
FIG. 2 is a schematic cross-sectional view of an optical fiber suitable for use in certain embodiments of the invention.

A general structure of an optical fiber suitable for use in the invention is shown in FIG. 2. Optical fiber 220 includes a core 226, and a first cladding 228 disposed about the core. The core 226 comprises a concentration of rare earth for providing optical gain at a selected wavelength in response to receiving optical pump energy. The first cladding and core are configured to guide light of the selected wavelength. The person of skill in the art can select appropriate refractive indices and dimensions to provide the desired guiding characteristics.

Figure 3:
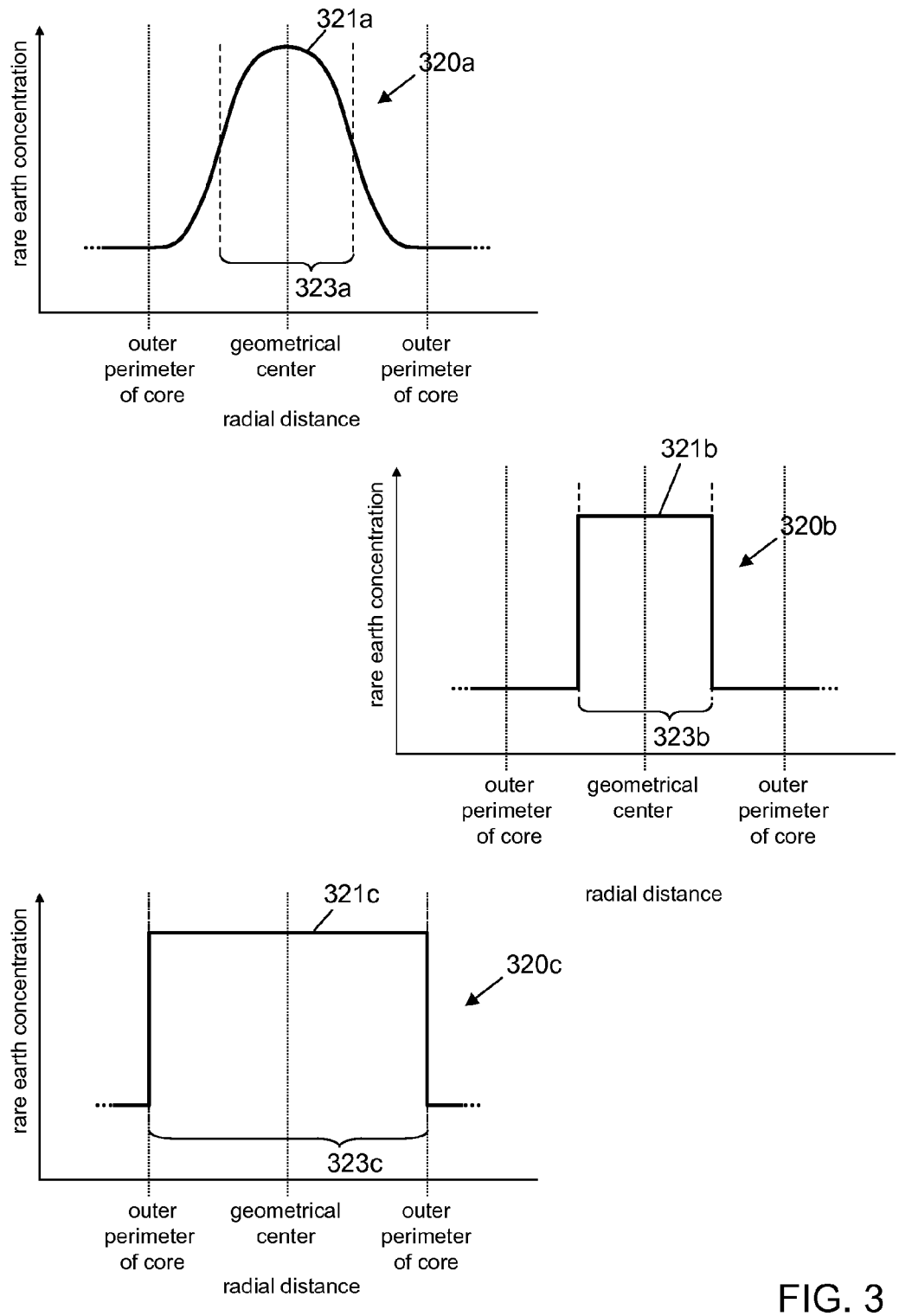
FIG. 3 is a set of schematic views of rare earth concentration profiles of various optical fibers suitable for use in certain embodiments of the invention.

The core 226 of the optical fiber has a first cross-sectional region within which the concentration of the rare earth does not fall below 50% of its highest concentration. A few examples of rare earth doping profiles that can be suitable for use in various embodiments of the invention are shown in FIG. 3. In profile 320a, the rare earth concentration 321a continually varies as a function of radial distance from the geometrical center of the fiber; the first cross-sectional region within which the concentration of the rare earth does not fall below 50% of its highest concentration is denoted by reference numeral 323a. In profile 320b, the rare earth concentration 321b follows a step function, with a first cross-sectional region 323b within which the concentration of the rare earth does not fall below 50% of its highest concentration. In certain profiles, such as 320c, the rare earth concentration 321c is a step function with rare earth throughout the core; in this case, the first cross-sectional region 323c within which the concentration of the rare earth does not fall below 50% of its highest concentration is coextensive with the area of the entire core of the optical fiber.

As described above, the core of optical fiber includes a rare earth, i.e., an element having an atomic number in the range 57 to 71. The rare earth is selected so as to provide light of the selected wavelength responsive to being pumped by light of a pump wavelength that is different than the selected wavelength. The core can be doped with, for example, ytterbium. In some embodiments of the invention, the core is doped with erbium; or ytterbium in combination with erbium. In other embodiments of the invention, the core can be doped with one or more other rare earths, such as thulium or neodymium. As described in more detail below, the person of skill in the art will select the identity and concentration of the rare earth(s) to provide a desired generation or amplification of light.

The one or more sources of optical pump energy are configured to provide pump energy to the optical fibers. The one or more sources of optical pump energy can be, for example, diode lasers. The pump wavelength (i.e., the wavelength) of the optical pump energy can be selected to be an appropriate pump wavelength for the particular rare earth used in the fiber. For example, when the rare earth is ytterbium, in certain embodiments the source(s) of optical pump energy can provide a pump wavelength of about 910 nm, or about 975 nm. When the rare earth is erbium, in certain embodiments the source of optical pump energy can provide a pump wavelength of about 980 nm, or about 1480 nm.

The optical fiber laser of FIG. 1 is described as using fiber Bragg gratings as reflectors to define the Fabry-Perot cavity. Of course any other kind of optical reflector could also be used, including, for example, multilayer coatings, metal coatings or photonic crystals. Reflectors can be deposited or fabricated directly onto a fiber end; or fabricated as separate elements that are optically coupled to the fiber. Moreover, as the person of skill will recognize, virtually any desired fiber laser architecture can be used in the fiber lasers of the present invention.

Figure 4:
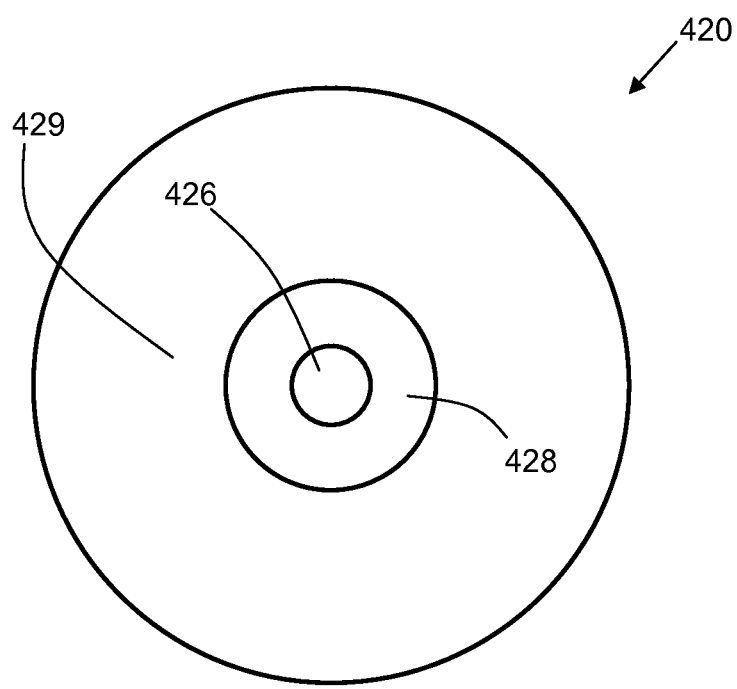
FIG. 4 is a schematic cross-sectional view of an optical fiber suitable for use in certain embodiments of the invention.

In certain embodiments, one or more of the optical fibers can include a second cladding surrounding the first cladding, for example, to form a so-called "double-clad fiber." For example, in the embodiment shown in FIG. 4, optical fiber 420 includes a core 426, a first cladding 428 surrounding the core, and a second cladding 429 surrounding the first cladding. The second cladding 429 can, for example, be of relatively lower refractive index than the first cladding 428, and, in operation, can tend to confine the radiation from a source of optical pump energy to the first cladding 428 and the core 426. The person of skill in the art can select appropriate refractive indices and dimensions to provide the desired guiding characteristics.

Figure 5:
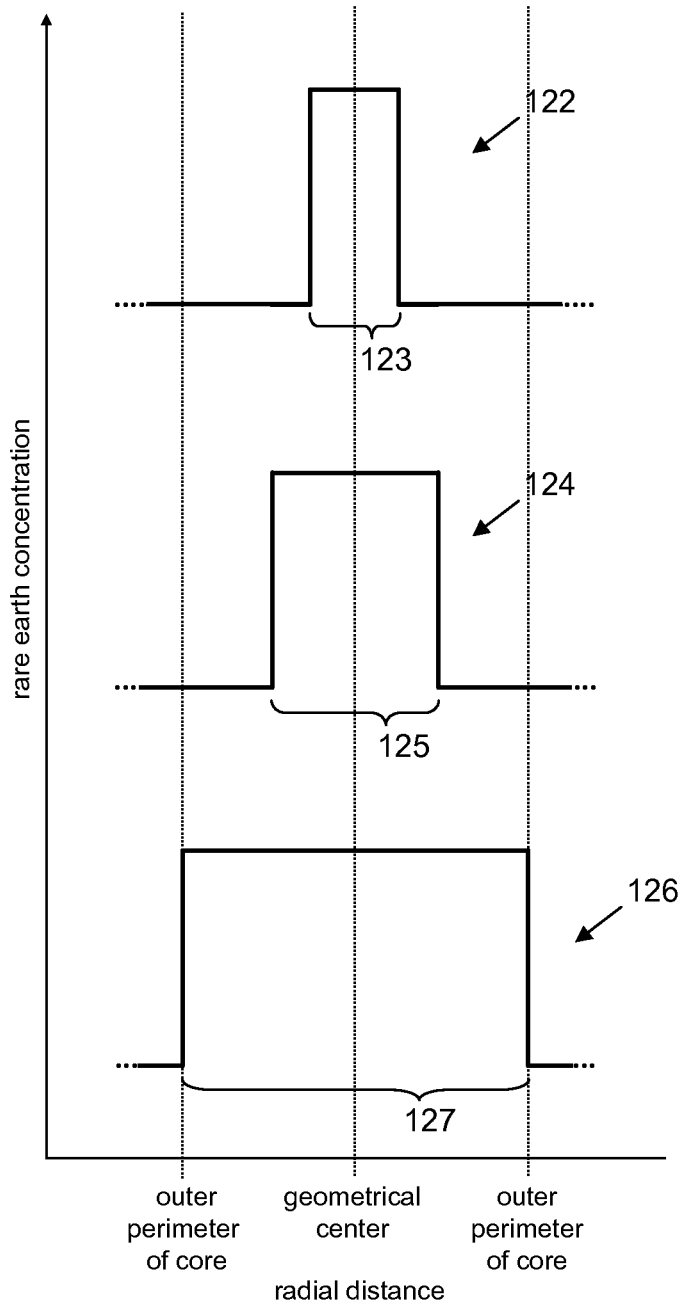
FIG. 5 is a set of schematic views of rare earth concentration profiles of three optical fibers suitable for use in an optical fiber device according to one embodiment of the invention.

Rare earth doping profiles for the three lengths of optical fiber in the optical fiber device of FIG. 1 are provided in FIG. 5. Notably, in the optical fiber device of FIG. 1, the first cross-sectional region 125 of the core of the second length of optical fiber 124 is larger in area than the first cross-sectional region 123 of the core of the first length of optical fiber 122. Similarly, the first cross-sectional region 127 of the third length of optical fiber 126 is larger in area than the first cross-sectional region 125 of the second length of optical fiber. In the configuration of FIG. 1, the pump intensity is highest in the first length of optical fiber 122, as it is closest to the source of optical pump energy 110. Only after some of the pump energy is attenuated by the first length of optical fiber 122 does it reach the second length of optical fiber 124; accordingly, the intensity is lower in the second length of optical fiber than in the first. Similarly, the intensity is lower in the third length of optical fiber 126 than in the second. In other configurations of optical fiber devices, the person of skill in the art can determine the relative pump intensities in the various lengths of optical fibers therein.

As described above, the source of optical pump energy 110 is coupled to the lengths of optical fiber 122, 124, 126 such that at least 2% (or at least 5%, at least 10%, or even at least 20%) of the fiber-coupled pump energy is delivered to each length of optical fiber 122, 124, 126.

The magnitude of cooperative effects such as up-conversion and luminescence are strongly related to the inversion level of the rare earth doped fiber. For example, in ytterbium-doped fibers, the intensity of undesired blue-green luminescence is much more visible in areas of high pump intensity. In cladding-pumped fibers, the inversion is proportional to the pump intensity and the overlap integral between the cladding and the rare earth doped region of the core. The overlap integral can be calculated using the equation $$\eta = \frac{\left[\int E_{clad}(x,y) E_{core}(x,y)[RE](x,y)dxdy\right]^2}{[\int E_{clad}^2(x,y)dxdy][(E_{core}(x,y)[RE](x,y)^2)dxdy]},$$

in which $E_{clad}(x,y)$ and $E_{core}(x,y)$ are the mode field profiles of the cladding and core modes, respectively, and $[RE](x,y)$ is the profile of the concentration of rare earth (i.e., normalized as a fraction of maximum concentration). Accordingly, in the configuration of FIG. 1, the overlap integral between the cladding and core modes for the pump wavelength is relatively smaller in the first length of optical fiber than in the second length of optical fiber. Because the intensity of optical pump energy is relatively higher in the first length of optical fiber than in the second length of optical fiber (i.e. due to its position closer to the source of optical pump energy). By using lengths of optical fiber with lower overlap integral in areas of higher pump intensity, inversion can be relatively reduced, thereby reducing the magnitude of cooperative effects. In lengths of optical fiber that experience relatively lower pump energies (e.g., at positions farther from the source of optical pump energy), optical fibers with higher overlap integrals (e.g., with larger areas of rare earth doping) can be used.

In certain embodiments of the optical fiber devices described above, the product of the maximum intensity of optical pump energy in the second length of optical fiber and the overlap integral between the cladding and rare earth doped region of the core of the second length of optical fiber is in the range of 50%-150%, in the range of 75%-125%, or even in the range of 90%-110% of the product of the maximum intensity of optical pump energy in the first length of optical fiber and the overlap integral between the cladding and rare earth doped region of the core of the first length of optical fiber. Similarly, if the optical fiber device includes additional lengths of optical fiber optically coupled to the one or more sources of optical pump energy (e.g., a third length of optical fiber as described above with reference to FIG. 1), such lengths of optical fiber can in certain embodiments be configured such that the product of the maximum intensity of optical pump energy therein and the overlap integral between the cladding and rare earth doped region of the core thereof is in the range of 50%-150%, in the range of 75%-125%, or even in the range of 90%-110% of the product of the maximum intensity of optical pump energy in the first length of optical fiber and the overlap integral between the cladding and rare earth doped region of the core of the first length of optical fiber. In such embodiments, the maximum inversion in each length of optical fiber is of a similar magnitude, and can be selected by the person of skill in the art to provide a desired efficiency of amplification/light generation while providing an acceptably low level of cooperative effects.

In certain embodiments of the optical fiber devices described above, the maximum inversion in the second length of optical fiber (e.g., computed as described below for the position in the second length of optical fiber having the highest intensity of optical pump energy) is in the range of 50%-150%, in the range of 75%-125%, or even in the range of 90%-110% of the maximum inversion in the first length of optical fiber. Similarly, if the optical fiber device includes additional lengths of optical fiber optically coupled to the one or more sources of optical pump energy (e.g., a third length of optical fiber as described above with reference to FIG. 1), such optical fibers can in certain embodiments be configured such that their maximum inversion is in the range of 50%-150%, in the range of 75%-125%, or even in the range of 90%-110% of the maximum inversion in the first length of optical fiber. In such embodiments, the maximum inversion in each length of optical fiber is of a similar magnitude, and can be selected by the person of skill in the art to provide a desired efficiency of amplification/light generation while providing an acceptably low level of cooperative effects.

In certain embodiments of the optical fiber devices described above, the total cross-sectional area of the core of the first length of optical fiber is substantially the same size as the total cross-sectional area of the core of the second length of optical fiber. Similarly, when the device includes additional lengths of optical fiber (e.g., a third length of optical fiber), they can also have cores with substantially the same total cross-sectional area as that of the first length of optical fiber. The use of lengths of optical fiber having cores of substantially the same size can provide advantages, for example, in splicing adjacent lengths to one another with relatively low loss.

Figure 6:
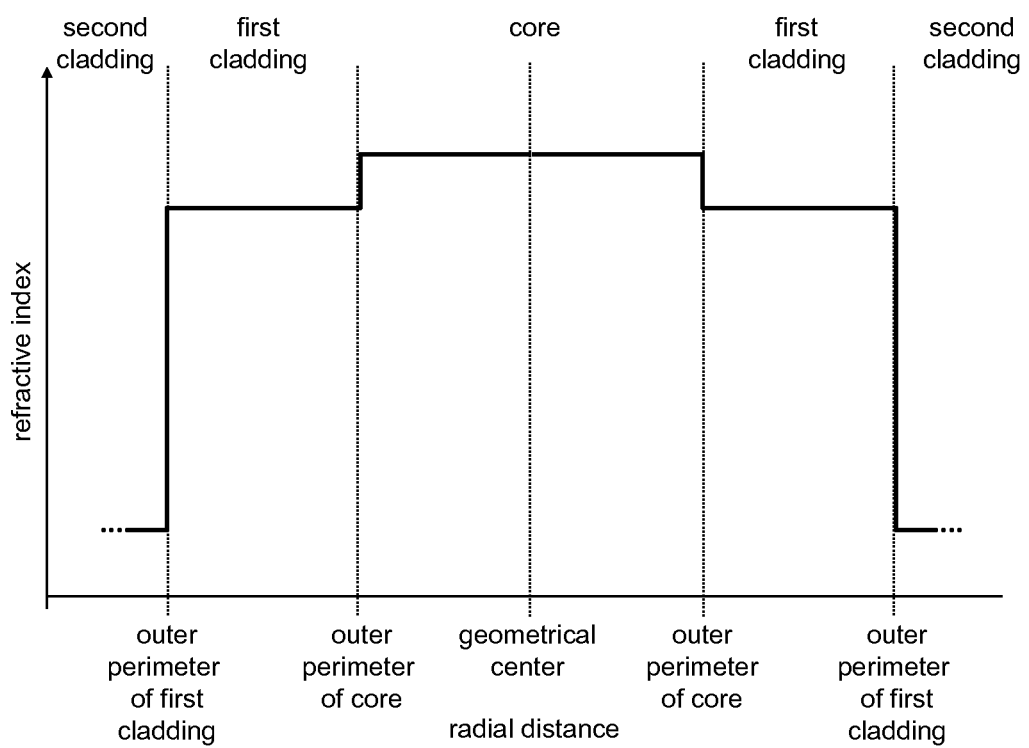
FIG. 6 is a schematic view of an index profile of an optical fiber suitable for use in an optical fiber device according to one embodiment of the invention.

The index profiles of the three lengths of optical fiber 122, 124, 126 used in the optical fiber device of FIG. 1 can have a so-called "pedestal" configuration, as shown in FIG. 6. In the index profile of FIG. 6, the first cladding has a refractive index that is only slightly smaller than the refractive index of the core, providing the optical fiber with a relatively large modal area, which can provide a number of advantages. The second cladding is of much lower refractive index; it can be formed, for example, from undoped silica or fluorine-doped silica. In this fashion, undoped or fluorine-doped silica can conveniently be used for a large proportion of the optical fiber, while the first (i.e., inner) cladding pedestal provides the desirable optical properties. Such double-clad optical fiber designs are familiar to the person of skill in the art.

In the profile shown in FIG. 6, the core (i.e., the rare earth doped area and/or the non-rare earth doped area) are doped such that there is no index discontinuity. That is, if the rare earth doping is as in length of optical fiber 124 in FIG. 5, the rare earth doped region 125 and/or the remainder of the core is doped so that the refractive indices of the rare earth doped region and the remainder of the core are substantially the same. Of course, in other embodiments, the index contribution of the rare earth doping can provide a small index discontinuity (e.g., as an intermediate step or gradient in the core).

The cores of the lengths of optical fiber useful in the present invention can have any of a variety of sizes. For example, in certain embodiments, a core can have a diameter of at least about 20 μm, at least about 30 μm, or even at least about 40 μm. In certain embodiments of the invention, the core has a radius in the range of about 12 μm to about 50 μm, or about 16 μm to about 34 μm. As noted above, the person of skill in the art will select the core diameter to provide the desired device properties (e.g., waveguiding characteristics).

In some embodiments, it can be desirable to use an optical fiber with a relatively large mode field diameter. To this end, relatively large cores can be used in the optical fibers of the optical fiber device. To maintain acceptable beam quality, it can be desirable to keep the numerical aperture of the core low. Moreover, it can be desirable to select a numerical aperture to yield a cutoff wavelength greater than the selected wavelength, in order to avoid excessive bend loss for the fundamental mode. This can often result in the mode field diameter of the fundamental mode to be smaller than the core of the optical fiber. When operating only in the fundamental mode for the selected wavelength, if the entire core of the optical fiber is doped with rare earth, there would be an annular region at the periphery of the core that does not interact with the fundamental mode, which can result in high inversion, and hence increased risk of cooperative effects. Accordingly, at areas of the device where the pump intensity is highest, it can be desirable to limit the cross-sectional region of the core that is doped with active ions to overlap with the area of the fundamental mode.

The first cladding of an optical fiber useful in the present invention is configured so that it and the core guide light of the selected wavelength (e.g., of the amplified or generated wavelength). As the person of skill in the art will appreciate, the first cladding can also perform any of a number of additional functions. For example, as described in more detail below, in some embodiments, the first cladding is doped to function as an index pedestal that allows for low NA waveguiding, and/or operate to guide pump energy, as in cladding-pumped optical fibers.

The first cladding of an optical fiber useful in the present invention can have any of a variety of sizes. For example, when the first cladding has a second cladding immediately surrounding it as described above, it can have, in certain embodiments, an average radial thickness (as measured from the outer perimeter of the core to the inner perimeter of the second cladding) in the range of about 5 μm to about 60 μm, or about 10 μm to about 30 μm. In other embodiments, for example when the rare earth concentration in the core is relatively low, or when the core is down-doped (e.g., with fluorine) to lower its index, the first cladding can have an average radial thickness in the range of about 50 μm to about 500 μm, or 100 μm to about 300 μm. The person of skill in the art will understand that the thickness of the first cladding can vary widely, depending on the particular optical fiber architecture used.

As described above, in certain optical fibers useful in the present invention the first cladding has a second cladding immediately surrounding it. The region of the second cladding lying within 10 μm of its inner perimeter can have, for example, an average refractive index that is less than the average refractive index of the first cladding. In such embodiments, the first cladding can act as a pump cladding for receiving pump light for pumping the rare earth in the core. The difference between the average refractive index of the region of the first cladding lying within 5 μm of the outer perimeter of the core and the average refractive index of the region of the second cladding lying within 10 μm of its inner perimeter can be, for example, at least about 0.0005, at least about 0.001, or even at least about 0.0025. In these embodiments of the invention, the first cladding can provide a so-called refractive index "pedestal," providing the optical fiber a relatively low numerical aperture. In other embodiments, the first cladding can act as a pedestal, and the second cladding acts as a pump cladding, as is familiar to the person of skill in the art. In certain embodiments of the invention, the first cladding and the second cladding are substantially free of rare earth.

In certain embodiments of the optical fiber devices described above, the numerical aperture of the core of the first length of optical fiber is substantially the same as the numerical aperture of the core of the second length of optical fiber. Similarly, when the device includes additional lengths of optical fiber (e.g., a third length of optical fiber), they can also have cores with substantially the same numerical aperture as that of the first length of optical fiber. The numerical aperture of the optical fiber can be, for example, at least about 0.04, or even at least about 0.06. For example, the numerical aperture of the optical fiber can be in the range of about 0.04 to about 0.26. In certain embodiments of the invention, the numerical aperture of the optical fiber is in the range of about 0.12 to about 0.26, typical values for an optical fiber of the invention used as a beam delivery fiber. In other embodiments of the invention, the numerical aperture of the core can be in the range of about 0.04 to about 0.12, or about 0.05 to about 0.11. The person of skill in the art will select an NA that provides the desired fiber characteristics (e.g., guiding, bend sensitivity, coupling properties).

The refractive index profile of FIG. 6 is a step index profile, and can be similar to that of many conventional optical fibers. $n_1$ and $n_2$ are the indices of refraction (measured at the selected wavelength) of the core and first cladding, respectively. The numerical aperture can be calculated as $\sqrt{n_1^2 - n_2^2}$ for a step index refractive index profile. The refractive index profiles of FIG. 6 are idealized, and are but examples of suitable refractive index profiles.

In certain embodiments of the optical fiber devices described above, the maximum concentration of the rare earth in the core of the first length of optical fiber is substantially the same as the maximum concentration of the rare earth the core in the second length of optical fiber. Similarly, when the device includes additional lengths of optical fiber optically coupled to the one or more sources of optical pump energy (e.g., a third length of optical fiber), they can also have cores with substantially the same the maximum concentration of the rare earth as that of the core of the first length of optical fiber. For certain optical fibers (e.g., those that rely upon energy transfer processes for efficient operation, such as Yb-codoped Er and 790 nm-pumped Tm) use of substantially similar maximum concentrations of rare earths can allow the person of skill in the art to address cooperative effects without destroying device efficiency.

The maximum concentration of rare earth can be, for example, Yb or Er in the range of about 0.01 wt % to about 2 wt %, or even 0.02 wt % to about 0.60 wt % (measured as the oxide). In other embodiments, the maximum concentration of rare earth can be Tm in the range of about 1 wt % to about 10 wt %, or even about 2 wt % to about 6 wt % (measured as the oxide). In other embodiments, the maximum concentration of rare earth is a mixture of Er and Yb, in a mole ratio ranging from 0.05-0.5 Er:Yb, at a total concentration in the range of about 5 wt % to about 20 wt %, or even about 8 wt % to about 17 wt % (measured as the oxides). Of course, the person of skill in the art can select other rare earths and/or concentrations, as appropriate. In certain embodiments, the concentration of rare earth is substantially constant throughout the first cross-sectional region of the core of the first length of optical fiber, the second length of optical fiber, or both (i.e., the fiber(s) have a step concentration profile, differing in the radial distance of their step). Similarly, when the device includes additional lengths of optical fiber (e.g., a third length of optical fiber), they can also have substantially constant concentrations of rare earth in the first cross-sectional regions of their cores. As noted above, the person of skill in the art will select the identity and concentration of the rare earth(s) to provide a desired generation or amplification of light.

In light of the present disclosure, the person of ordinary skill in the art can use standard optical fiber materials and processes to make the optical fibers useful in the present invention. For example, the core and cladding(s) of an optical fiber of the present invention can be formed from silica-based materials. The dopants of the core and/or cladding(s) can be selected to provide the desired refractive and acoustic index profiles. For example, the core can be doped, with one or more of aluminum, phosphorus and/or fluorine as dopants. Similarly, the cladding(s) can be doped with germanium, fluorine and/or boron, among others. A part of a fiber, such as the cladding, can be of a photonic bandgap or holey design, or can include voids that macroscopically reduce the effective index of refraction by lowering the average index of refraction of the region including the voids.

Certain exemplary refractive index profiles that can be useful in fibers according to the invention are discussed herein and depicted in schematic view in the figures. These refractive index profiles are idealized. Actual refractive index profiles measured on a preform or from an actual optical fiber drawn from the preform can include other features, as is well known in the art, such as rounded edges between sections and the signature "dip" in the index of refraction of the core due to the burnoff of dopants in the core during the collapse stage of the MCVD process (assuming that the MCVD process is used to fabricate the optical fiber preform). Also, in certain embodiments of the invention, each of the sections of the refractive index profile corresponding to a particular part of the fiber has a substantially constant index of refraction. This need not be true in all practices of the invention. As is well known in the art, the index of refraction need not be constant. The index of refraction can be varied according to a predetermined function to provide a particular result. For example, it is known in the art to provide a core comprising a graded refractive index profile, where the profile corresponds to a parabola, a power law, or other suitable function; numerical aperture calculations are available for these profiles as well.

As used herein, the use of open language (e.g., comprise, have, include, etc.) in conjunction with describing the index of refraction of a portion, or a propagation velocity of a portion, (e.g., a portion has an index of refraction n) does not mean that the specified feature of the portion need be constant throughout the portion. When a length of optical fiber has a property that varies along its length, recited figures are for the average along the length. Moreover, each "length" of optical fiber can in certain embodiments be a section of a larger piece of optical fiber.

The person of ordinary skill in the art can, based on the present disclosure, use any suitable method for manufacturing optical fibers suitable for use in the present invention. An optical fiber is typically drawn from a solid preform, though "preform", as that term is used herein, is intended to include a crucible-type arrangement using which a fiber is drawn from a mass of viscous material through an appropriate aperture or set of apertures. Any of a number of techniques, such as OVD, MCVD, flame hydrolysis and rod-in-tube can be used to make the preform from which the optical fiber is drawn. As the person of ordinary skill will appreciate, an optical fiber suitable for use in the present invention can be coated with one or more polymeric coatings. In certain embodiments, the polymer coating can provide additional light confinement (e.g., it can be a low-index polymer such as a fluoropolymer). For example, the optical fiber can be a so-called "triple-clad" fiber, in which the second cladding is a low-index fluorosilicate, and the polymer coating acts as a third cladding. In other embodiments, for example when the optical fiber has an index pedestal profile and an outer cladding (e.g., undoped or fluorine-doped silica), the optical fiber can optionally be provided without a polymer coating. An optical fiber suitable for use in the present invention can also include other features, such as one or more polarization-maintaining stress rods.

The person of skill in the art can use a variety of rare earth doped optical fibers in practicing the present invention. For example, the person of skill can use optical fibers such as those described in International Patent Application Publications nos. WO 2010/085065; WO 2006/017802 and WO 2002/059660, and in U.S. Pat. Nos. 6,477,307; 6,625,363; 6,779,364, 6,687,445; 7,003,206; 7,050,686; and 7,062,137, and in U.S. Provisional Patent Application Ser. No. 61/147,038, each of which is hereby incorporated by reference in its entirety.

Figure 7:
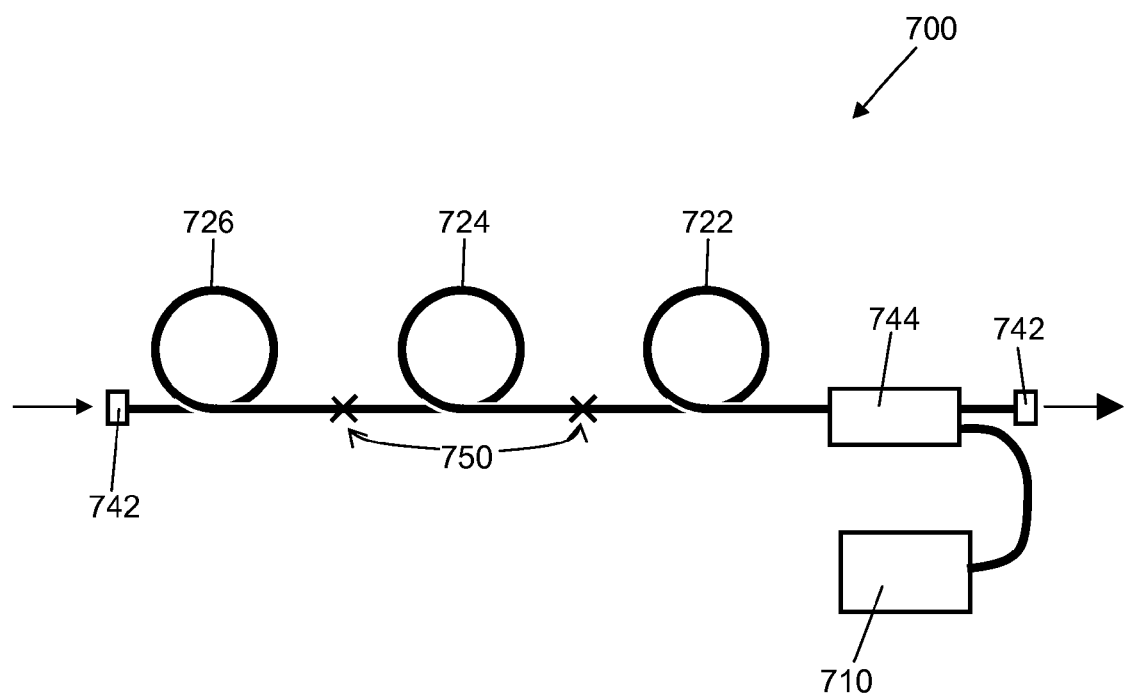
FIG. 7 is a schematic view of an optical fiber amplifier according to one embodiment of the invention.

Another embodiment of the invention is shown in schematic view in FIG. 7. Optical fiber device 700 is configured as a counter-pumped fiber amplifier, and includes a source of optical pump energy 710, a first length of optical fiber 722, and a second length of optical fiber 724 optically coupled to the source 710. In the embodiment of FIG. 7, the optical fiber device further includes a third length of optical fiber 726 optically coupled to the source 710. The first length of optical fiber 722 is optically coupled between the source of optical pump energy 710 and the second length of optical fiber 724 such that the intensity of the pump energy is higher in the first length of optical fiber than in the second. In the embodiment of FIG. 7, the first length of optical fiber 722 and the second length of optical fiber 724 are optically coupled between the source of optical pump energy 710 and the third length of optical fiber 726, such that the intensity of the pump energy is higher in the second length of optical fiber than in the third. Splices 750 are used to connect the lengths of optical fiber. The source of optical pump energy 710 is coupled into the first length of optical fiber 722 by coupler 744. Isolators 742 are positioned at either end of the device. An optical signal to be amplified enters third length of optical fiber 726, moving from there to second length of optical fiber 724, and then to first length of optical fiber 722.

While the amplifier described above with reference to FIG. 7 is counter-pumped, the person of skill in the art will recognize that amplifiers according to the present invention can be co-pumped, or pumped with a more complicated pumping scheme. For example, when the optical fiber device is pumped from both an input end and an output end, it may be desirable to have lengths of optical fiber with smaller regions of rare earth doping at both the input end and the output end of the device, where the pump intensity is highest. In other embodiments using other pumping configurations, the person of skill in the art can determine in which regions of the optical path the pump intensity would be highest, and use lengths of optical fiber with relatively smaller regions of rare earth doping in those regions.

The optical fiber devices of the present invention can take a variety of forms. In certain embodiments, for example as described above with reference to FIG. 1, the optical fiber device is configured as an optical fiber laser. In other embodiments, for example as described above with reference to FIG. 7, the optical fiber device is configured as an optical fiber amplifier. As would be evident to the person of skill in the art, an optical fiber device of the present invention can be packaged in a suitable enclosure, with appropriate optical and electrical connectors. Of course, other optical and optoelectronic elements can be integrated into or with the fiber devices as described herein, as appropriately determined by the person of skill in the art. The optical fiber devices of the present invention can be provided as multi-stage amplifiers or lasers; in such embodiments, the recited lengths of optical fibers are desirably coupled together in the same stage of the device. For example, in certain embodiments, the optical fiber device includes or is integrated with one or more additional optical amplifier or laser stages, optically coupled to provide radiation of the selected wavelength to the lengths of optical fiber, but isolated so as to provide substantially no radiation at the pump wavelengths to the optical fibers. The optical fiber devices of the present invention can also be used as part of (and packaged together with) a larger optoelectronic system.

Another aspect of the invention is a method for providing optical gain at a selected wavelength. Optical pump energy from one or more sources of optical pump energy is provided to a first length of optical fiber comprising a core and a first cladding disposed about the core, the first cladding and core configured to guide light of a selected wavelength, the core comprising a concentration of a rare earth for providing the optical gain in response to receiving the optical pump energy, the core comprising a first cross-sectional region within which the concentration of the rare earth does not fall below 50% of its highest concentration. Optical pump energy is also provided from the one or more sources of optical pump energy to a second length of optical fiber optically coupled to the first length of optical fiber, the second length of optical fiber comprising a core and a first cladding disposed about the core, the first cladding and core configured to guide light of the selected wavelength, the core comprising a concentration of the rare earth for providing the optical gain in response to receiving the optical pump energy, the core comprising a first cross-sectional region within which the concentration of the rare earth does not fall below 50% of its highest concentration. The optical pump energy is provided to the first length of optical fiber and to the second length of optical fiber such that the intensity of the pump energy is higher in the second length of optical fiber than in the first length of optical fiber, and such that at least 2% of the fiber-coupled optical pump energy from each of the one or more sources of optical pump energy is delivered to the first length of optical fiber and the second length of optical fiber. The first cross-sectional region of the core of the second length of optical fiber is larger in area than the first cross-sectional region of the core of the first length of optical fiber. The first length of optical fiber and the second length of optical fiber and the relationships therebetween can be, for example, as described with respect to any of the above optical fiber device embodiments.

The optical pump energy can, for example, be provided to the second length of optical fiber by the first length of optical fiber (e.g., as in the embodiments described with respect to FIGS. 1 and 7).

In certain embodiments, the method further includes providing optical pump energy from the one or more sources of optical pump energy to a third length of optical fiber optically coupled to the second length of optical fiber, the third length of optical fiber comprising a core, a cladding disposed about the core, the cladding and core configured to guide light of a selected wavelength, the core comprising a concentration of the rare earth for providing the optical gain in response to receiving the optical pump energy, the core comprising a first cross-sectional area within which the concentration of the rare earth does not fall below 50% of its highest concentration, and a second cross-sectional area within which the concentration of the rare earth is at 50% of its highest concentration or below. The optical pump energy is provided to the third length of optical fiber such that the intensity of optical pump energy is higher in the third length of optical fiber than in the second length of optical fiber, and such that at least 2% of the fiber-coupled optical pump energy from each of the one or more sources of optical pump energy is delivered to the third length of optical fiber. The first cross-sectional region of the core of the third length of optical fiber is larger in area than the first cross-sectional region of the core of the second length of optical fiber. The third length of optical fiber and the relationships between it and the first and second lengths of optical fiber can be substantially as described above with reference to the optical fiber device embodiments.

Figure 8:
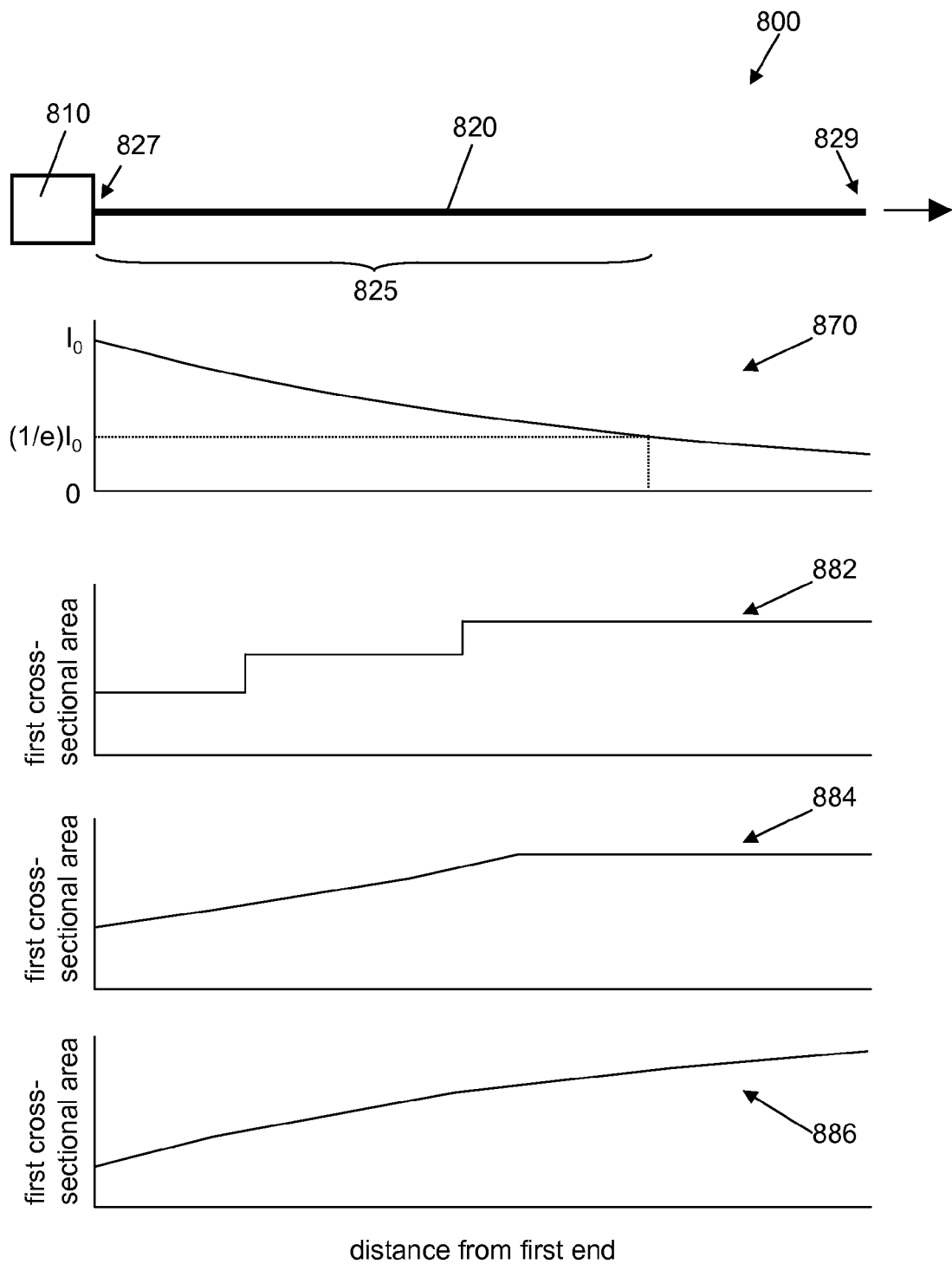
FIG. 8 is a schematic view of an optical fiber device according to one embodiment of the invention.

Another aspect of the invention is an optical fiber device as shown in schematic view in FIG. 8. Optical device 800 comprises one or more lengths of optical fiber, shown together as reference number 820. As described above with reference to FIGS. 1-7, each length of optical fiber comprises a core and a first cladding disposed about the core, with the first cladding and core being configured to guide light of the selected wavelength. Similarly, as described above with reference to FIGS. 1-7, the core of each length of optical fiber comprises a concentration of a rare earth for providing the optical gain in response to receiving optical pump energy. Moreover, as described above with reference to FIGS. 1-7, the core of each length of optical fiber comprises a first cross-sectional region within which the concentration of the rare earth does not fall below 50% of its highest concentration. The one or more lengths of optical fiber are optically coupled to one another in an end-to-end fashion, so that the one or more lengths of optical fiber has a first end 827 and a second end 829. Optical device 800 further comprises a source of optical pump energy 810, optically coupled to the first end 827 of the one or more lengths of optical fiber 820. The field intensity of the optical pump energy in the one or more lengths of optical fiber 820 is shown by graph 870; the point at which the field intensity is (1/e) times the field intensity at the first end 827 is marked thereon. For the distance along the one or more lengths of optical fiber from the first end extending toward the second end for which the field intensity of optical pump energy is greater than (1/e) of the field intensity of the optical pump energy at the first end (shown by reference number 825), the first cross-sectional region of the core of the one or more lengths of optical fiber is essentially monotonically increasing (i.e., getting larger or staying substantially the same) in area. Graphs 882, 884 and 886 are graphs of cross-sectional region area vs. fiber position for a few different examples according to this aspect of the invention. As the person of skill in the art will understand, the optical fibers and devices can be constructed as described above with respect to FIGS. 1-7.

Another aspect of the invention is a method for providing optical gain at a selected wavelength. Optical pump energy is provided to one or more lengths of optical fiber, the one or more lengths of optical fiber being as described above with respect to FIG. 8.

EXAMPLE

Figure 9:
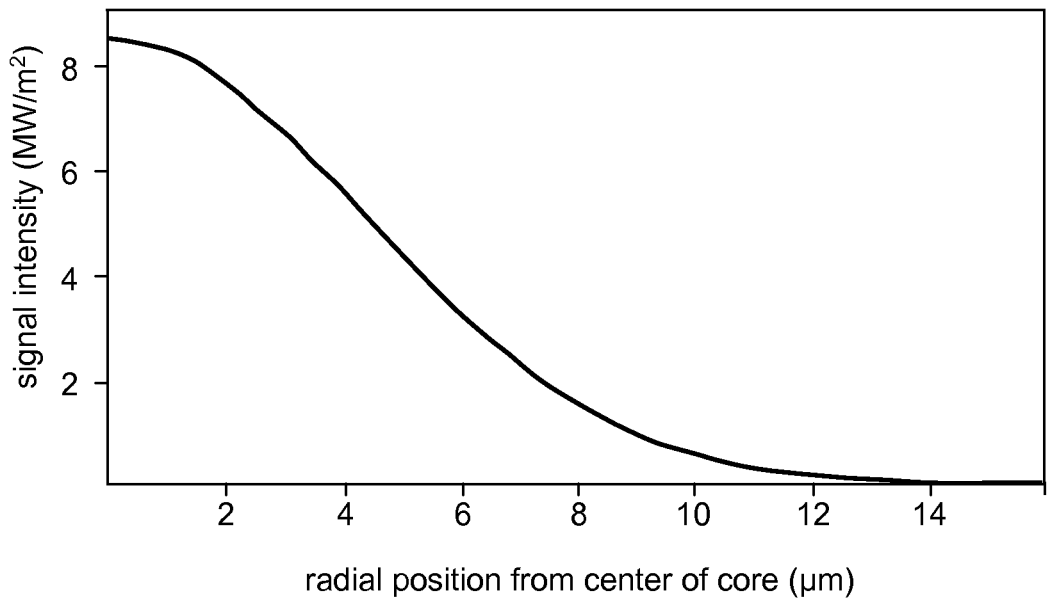
FIG. 9 is a plot of power intensity for an example of a Yb-doped optical fiber amplifier.

To determine inversion for a single-fiber Yb-doped fiber amplifier, amplifier performance was simulated. The Yb-doped fiber amplifier had the following parameters:
Signal power: 1 W
Signal wavelength: 1064 nm
Pump power: 50 W
Pump wavelength: 976 nm
Core diameter: 20 µm
Core NA: 0.06
Cladding diameter: 400 µm
For the seed signal, a mode field diameter (MFD) of 17.5 µm was computed. The modeled intensity profile of the Gaussian beam is shown in FIG. 9. The intensity is given by the formula $$I = a \cdot e^{\frac{-8x^2}{MFD^2}}$$

in which x is the radial position from the center of the core, and a is defined by the formula $$a = \frac{8P_0}{\pi MFD^2}$$

in which $P_0$ is the signal power.

By solving the applicable rate equations, the inversion distribution with respect to the radial position from the core center and along the length of the fiber were determined. The simplified rate equations for the 1064 nm transition in Yb are:

$$n2 = \frac{R_{12} + W_{12}}{R_{12} + R_{21} + W_{12} + W_{21} + A_{21}},$$

where $$R_{12} = \frac{\sigma_{12}^{(p)} I_p}{h\gamma_p},$$

$$R_{21} = \frac{\sigma_{21}^{(p)} I_p}{h\gamma_p},$$

$$W_{12} = \frac{\sigma_{12}^{(s)} I_s}{h\gamma_s}, \text{ and}$$

$$W_{21} = \frac{\sigma_{21}^{(s)} I_s}{h\gamma_s},$$

in which $\sigma_{12}$ denotes absorption cross section, $\sigma_{21}$ denotes emission cross section, p denotes pump and s denotes signal. $A_{21}$ is the 1/lifetime, which is taken as 850 µs. See Rüdiger et al., "Ytterbium-Doped Fiber Amplifiers," *IEEE J. Quant. Elect.*, Vol. 33, No. 7, pp. 1049-56 (1997), which is hereby incorporated by reference in its entirety.

Figure 10:
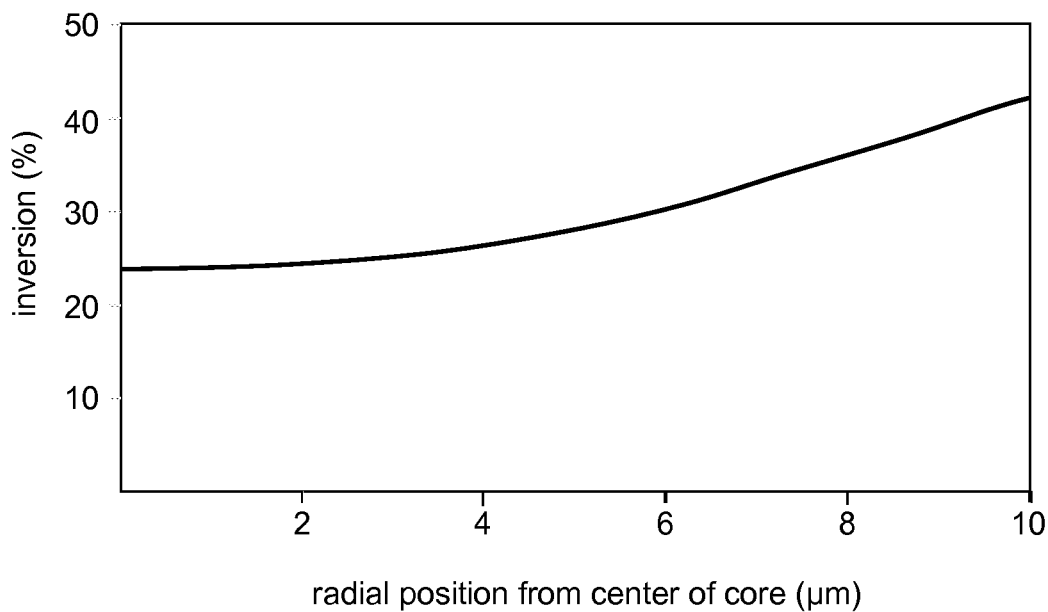
FIG. 10 is a plot of inversion vs. radial position from core for the example of the Yb-doped optical fiber amplifier.

Inversion was modeled for an optical fiber with Yb doped throughout its core at its front end (i.e., nearest the pump). The results are shown in FIG. 10. Inversion was about 24% at the center of the core; and about 43% at the interface with the cladding.

Figure 11:
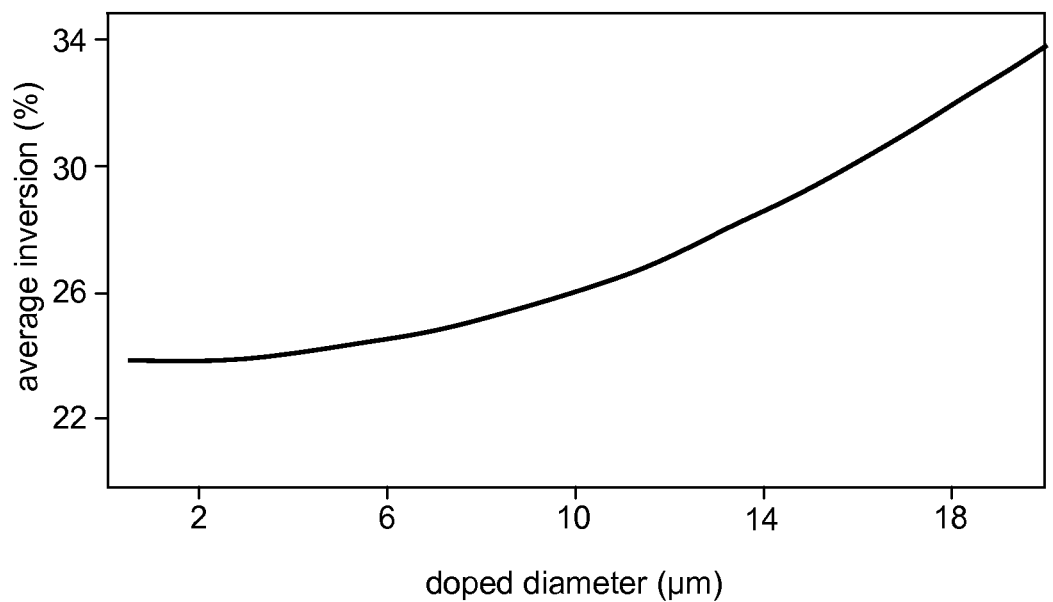
FIG. 11 is a plot of average inversion vs. doped diameter for a series of Yb-doped optical fibers having different doping.

These inversion data were used to calculate the average inversion for a series of optical fibers with different doping radii. The results are shown in FIG. 11. As is evident, lower average inversion, and therefore lower risk of cooperative effects, is demonstrated for single mode operation in fibers having relatively smaller diameters of doping.

Those of ordinary skill in the art will recognize or be able to ascertain using no more than routine experimentation many equivalents to the specific embodiments of the invention described herein. It is therefore to be understood that the foregoing embodiments are presented by way of example only and that within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not expressly taught as mutually inconsistent, is included within the scope of the present invention.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, 8th Edition, 8th Revision.

It will be apparent to those skilled in the art that various modifications and variations can be made to the present invention without departing from the scope of the invention. Thus, it is intended that the present invention cover the modifications and variations of this invention provided they come within the scope of the appended claims and their equivalents.

What is claimed is:

1. An optical fiber device for providing optical gain at a selected wavelength, the optical fiber device comprising:
   one or more sources of optical pump energy;
   a first length of optical fiber comprising a core and a first cladding disposed about the core, the first cladding and core configured to guide light of a selected wavelength, the core comprising a concentration of a rare earth for providing the optical gain in response to receiving optical pump energy, the core comprising a first cross-sectional region within which the concentration of the rare earth does not fall below 50% of its highest concentration, the first length of optical fiber further comprising a second cladding disposed about the first cladding, the second cladding having a lower refractive index than the first cladding, the second cladding being configured to confine the optical pump energy from the optical pump source to the first cladding and the core of the first length of optical fiber; and a second length of optical fiber comprising a core and a first cladding disposed about the core, the first cladding and core configured to guide light of the selected wavelength, the core comprising a concentration of the rare earth for providing the optical gain in response to receiving optical pump energy, the core comprising a first cross-sectional region within which the concentration of the rare earth does not fall below 50% of its highest concentration, the second length of optical fiber further comprising a second cladding disposed about the first cladding, the second cladding having a lower refractive index than the first cladding, the second cladding being configured to confine the optical pump energy from the optical pump source to the first cladding and the core of the second length of optical fiber, wherein the one or more sources of optical pump energy are optically coupled to the first length of optical fiber and the second length of optical fiber, such that the intensity of optical pump energy is higher in the first length of optical fiber than in the second length of optical fiber, and such that at least 2% of the fiber-coupled optical pump energy from each of the one or more sources of optical pump energy is delivered to the first length of optical fiber and the second length of optical fiber; and the first cross-sectional region of the core of the second length of optical fiber is larger in area than the first cross-sectional region of the core of the first length of optical fiber; and the overlap integral η is smaller in the first length of optical fiber than in the second length of optical fiber, the overlap integral being calculated by the equation $$\eta = \frac{\left[\int E_{clad}(x, y) E_{core}(x, y)[RE](x, y) dx dy\right]^2}{[\int E_{clad}^2(x, y) dx dy][(E_{core}(x, y)[RE](x, y)^2) dx dy]}.$$

2. The optical fiber device according to claim 1, wherein the first length of optical fiber and the second length of optical fiber are optically coupled to the source of optical pump energy such that the first length of optical fiber is optically coupled between the source of optical pump energy and the second length of optical fiber.

3. The optical fiber device according to claim 1, wherein the product of the maximum intensity of optical pump energy in the second length of optical fiber and the overlap integral η of the second length of optical fiber is in the range of 75%-125% of the product of the maximum intensity of optical pump energy in the first length of optical fiber and the overlap integral η of the first length of optical fiber.

4. The optical fiber device according to claim 1, wherein the maximum inversion in the second length of optical fiber is in the range of 75%-125% of the maximum inversion in the first length of optical fiber.

5. The optical fiber device according to claim 1, wherein the total cross-sectional area of the core of the first length of optical fiber is substantially the same size as the total cross-sectional area of the core of the second length of optical fiber.

6. The optical fiber device according to claim 1, wherein the maximum concentration of the rare earth in the core of the second length of optical fiber is substantially the same as the maximum concentration of the rare earth in the core of the first length of optical fiber.

7. The optical fiber device according to claim 1, wherein the concentration of rare earth is substantially constant throughout the first cross-sectional region of the core of the first length of optical fiber, the second length of optical fiber, or both.

8. The optical fiber device according to claim 1, further comprising
a third length of optical fiber comprising a core and a first cladding disposed about the core, the first cladding and core configured to guide light of a selected wavelength, the core comprising a concentration of the rare earth for providing the optical gain in response to receiving optical pump energy, the core comprising a first cross-sectional area within which the concentration of the rare earth does not fall below 50% of its highest concentration, and a second cross-sectional area within which the concentration of the rare earth is at 50% of its highest concentration or below, the third length of optical fiber further comprising a second cladding disposed about the first cladding, the second cladding having a lower refractive index than the first cladding, the second cladding being configured to confine the optical pump energy from the optical pump source to the first cladding and the core of the third length of optical fiber, wherein the one or more sources of optical pump energy are optically coupled to the third length of optical fiber, such that the intensity of optical pump energy is higher in the second length of optical fiber than in the third length of optical fiber, and such that at least 2% of the fiber-coupled optical pump energy from each of the one or more sources of optical pump energy is delivered to the third length of optical fiber; and the first cross-sectional region of the core of the third length of optical fiber is larger in area than the first cross-sectional region of the core of the second length of optical fiber; and the overlap integral η is smaller in the second length of optical fiber than in the third length of optical fiber.

9. The optical fiber device according to claim 8, wherein the first length of optical fiber, the second length of optical fiber and the third length of optical fiber are optically coupled to the source of optical pump energy such that the first length of optical fiber and second length of optical fiber are optically coupled between one of the sources of optical pump energy and the third length of optical fiber.

10. The optical fiber device according to claim 8, wherein the product of the maximum intensity of optical pump energy in the third length of optical fiber and the overlap integral η of the third length of optical fiber is in the range of 75%-125% of the product of the maximum intensity of optical pump energy in the first length of optical fiber and the overlap integral η of the first length of optical fiber.

11. The optical fiber device according to claim 8, wherein the maximum inversion in the third length of optical fiber is in the range of 75%-125% of the maximum inversion in the first length of optical fiber.

12. The optical fiber device according to claim 8, wherein the total cross-sectional area of the core of the second length of optical fiber is substantially the same size as the total cross-sectional area of the core of the third length of optical fiber.

13. The optical fiber device according to claim 8, wherein the maximum concentration of the rare earth in the core of the second length of optical fiber is substantially the same as the maximum concentration of the rare earth in the core of the first length of optical fiber.

14. The optical fiber device according to claim 8, wherein the concentration of rare earth is substantially constant throughout the first cross-sectional region of the core of the first length of optical fiber, the second length of optical fiber, or both.

15. The optical fiber device according to claim 1, wherein the rare earth is ytterbium, erbium, or a combination thereof.

16. A method of providing optical gain at a selected wavelength, the method comprising:

providing optical pump energy from one or more sources of optical pump energy to a first length of optical fiber comprising a core and a first cladding disposed about the core, the first cladding and core configured to guide light of a selected wavelength, the core comprising a concentration of a rare earth for providing the optical gain in response to receiving the optical pump energy, the core comprising a first cross-sectional region within which the concentration of the rare earth does not fall below 50% of its highest concentration, the first length of optical fiber further comprising a second cladding disposed about the first cladding, the second cladding having a lower refractive index than the first cladding, the second cladding being configured to confine the optical pump energy from the optical pump source to the first cladding and the core of the first length of optical fiber; and providing optical pump energy from the one or more sources of optical pump energy to a second length of optical fiber optically coupled to the first length of optical fiber, the second length of optical fiber comprising a core and a first cladding disposed about the core, the first cladding and core configured to guide light of the selected wavelength, the core comprising a concentration of the rare earth for providing the optical gain in response to receiving the optical pump energy, the core comprising a first cross-sectional region within which the concentration of the rare earth does not fall below 50% of its highest concentration, the second length of optical fiber further comprising a second cladding disposed about the first cladding, the second cladding having a lower refractive index than the first cladding, the second cladding being configured to confine the optical pump energy from the optical pump source to the first cladding and the core of the second length of optical fiber, wherein the optical pump energy is provided to the first length of optical fiber and to the second length of optical fiber such that the intensity of optical pump energy is higher in the first length of optical fiber than in the second length of optical fiber, and such that at least 2% of the fiber-coupled optical pump energy from each of the one or more sources of optical pump energy is delivered to the first length of optical fiber and the second length of optical fiber; and the first cross-sectional region of the core of the second length of optical fiber is larger in area than the first cross-sectional region of the core of the first length of optical fiber; and the overlap integral η is smaller in the first length of optical fiber than in the second length of optical fiber, the overlap integral being calculated by the equation $$\eta = \frac{\left[\int E_{clad}(x, y) E_{core}(x, y)[RE](x, y) dx dy\right]^2}{[\int E_{clad}^2(x, y) dx dy][(E_{core}(x, y)[RE](x, y)^2) dx dy]}.$$

17. The method according to claim 16, further comprising providing optical pump energy from the one or more sources of optical pump energy to a third length of optical fiber optically coupled to the second length of optical fiber, the third length of optical fiber comprising a core, a cladding disposed about the core, the cladding and core configured to guide light of a selected wavelength, the core comprising a concentration of the rare earth for providing the optical gain in response to receiving the optical pump energy, the core comprising a first cross-sectional area within which the concentration of the rare earth does not fall below 50% of its highest concentration, and a second cross-sectional area within which the concentration of the rare earth is at 50% of its highest concentration or below, the third length of optical fiber further comprising a second cladding disposed about the first cladding, the second cladding having a lower refractive index than the first cladding, the second cladding being configured to confine the optical pump energy from the optical pump source to the first cladding and the core of the third length of optical fiber, wherein the optical pump energy is provided to the third length of optical fiber such that the intensity of optical pump energy is higher in the second length of optical fiber than in the third length of optical fiber, and such that at least 2% of the fiber-coupled optical pump energy from each of the one or more sources of optical pump energy is delivered to the third length of optical fiber; and the first cross-sectional region of the core of the third length of optical fiber is larger in area than the first cross-sectional region of the core of the second length of optical fiber; and the overlap integral η is smaller in the second length of optical fiber than in the third length of optical fiber.

18. An optical fiber device for providing optical gain at a selected wavelength, the optical fiber device comprising:

a source of optical pump energy; and one or more lengths of optical fiber, each comprising a core and a first cladding disposed about the core, the first cladding and core configured to guide light of the selected wavelength, the core comprising a concentration of a rare earth for providing the optical gain in response to receiving optical pump energy, the core comprising a first cross-sectional region within which the concentration of the rare earth does not fall below 50% of its highest concentration, each length of optical fiber further comprising a second cladding disposed about the first cladding, the second cladding having a lower refractive index than the first cladding, the second cladding being configured to confine optical pump energy from the source of optical pump source to the first cladding and the core of the optical fiber, the one or more lengths being optically coupled to one another in an end-to-end fashion, so that the one or more lengths taken together has a first end and a second end, and the source of optical pump energy is optically coupled to the one or more lengths of optical fiber at the first end, wherein for the distance along the one or more lengths of optical pump energy from the first end extending toward the second end for which the field intensity of optical pump energy is greater than 1/e of the field intensity of the optical pump energy at the first end, the first cross-sectional region of the core of the one or more lengths of optical fiber is essentially monotonically increasing in area, and wherein the overlap integral η is smaller in a first length of optical fiber than in a second length of optical fiber, the overlap integral being calculated by the equation $$\eta = \frac{\left[\int\int E_{clad}(x,y)E_{core}(x,y)[RE](x,y)dxdy\right]^2}{[\int E_{clad}^2(x,y)dxdy][(E_{core}(x,y)[RE](x,y)^2)dxdy]},$$

the intensity of the optical pump energy being higher in the first length of optical fiber than in the second length of optical fiber.

19. The optical fiber device according to claim 1, further including an output end configured to output amplified optical radiation, wherein the first length of optical fiber is disposed between the second length of optical fiber and the output end of the device.

20. The optical fiber device according to claim 1, wherein at least one of the sources of optical pump energy is configured in a counter-pumping configuration with respect to the first length of optical fiber and the second length of optical fiber.

21. The optical fiber device according to claim 1, configured as a fiber laser in which the first and second fibers are disposed within a laser cavity.

22. The optical fiber device according to claim 18, configured as a fiber laser in which the one or more optical fibers are disposed within a laser cavity.

* * * * *